United States Patent [19]
McMahon et al.

[11] Patent Number: 5,381,428
[45] Date of Patent: Jan. 10, 1995

[54] TUNABLE YTTERBIUM-DOPED SOLID STATE LASER

[75] Inventors: John M. McMahon, Potomac, Md.; Robert C. Stoneman, Alexandria; Leon Esterowitz, Springfield, both of Va.

[73] Assignee: The United States of America as represented by the Secretary of the Navy, Washington, D.C.

[21] Appl. No.: 99,638

[22] Filed: Jul. 30, 1993

[51] Int. Cl.⁶ .................................................. H01S 3/10
[52] U.S. Cl. ........................................ 372/20; 372/22; 372/23; 372/71; 372/75
[58] Field of Search .................. 372/20, 22, 23, 69, 372/70–72, 75

[56] References Cited

U.S. PATENT DOCUMENTS

| | | | |
|---|---|---|---|
| 4,969,150 | 11/1990 | Esterowtiz et al. | 372/20 |
| 4,977,566 | 12/1990 | Herbst et al. | 372/20 |
| 5,038,360 | 8/1991 | Negus et al. | 372/20 |
| 5,058,980 | 10/1991 | Howerton | 372/70 |
| 5,091,912 | 2/1992 | Bretenaker et al. | 372/23 |
| 5,123,026 | 6/1992 | Fan et al. | 372/20 |
| 5,177,750 | 1/1993 | Zorabedian | 372/20 |
| 5,206,867 | 4/1993 | Esterowitz et al. | 372/20 |
| 5,249,190 | 9/1993 | Kortz et al. | 372/22 |

Primary Examiner—Georgia Y. Epps
Attorney, Agent, or Firm—Thomas E. McDonnell; John J. Karasek

[57] ABSTRACT

A tunable ytterbium-doped solid-state laser has a laser cavity defined a pair of mirrors, a laser medium positioned in this cavity, means for pumping the laser medium, and means for tuning the output of this laser medium to a selected wavelength within a wavelength range. The laser medium has a host material doped with enough ytterbium ions to produce a longitudinal mode laser emission when the laser medium is pumped. In a most preferred embodiment, the laser emission is frequency-doubled and tuned to a wavelength corresponding to a Fraunhoffer line in the solar spectrum.

23 Claims, 4 Drawing Sheets

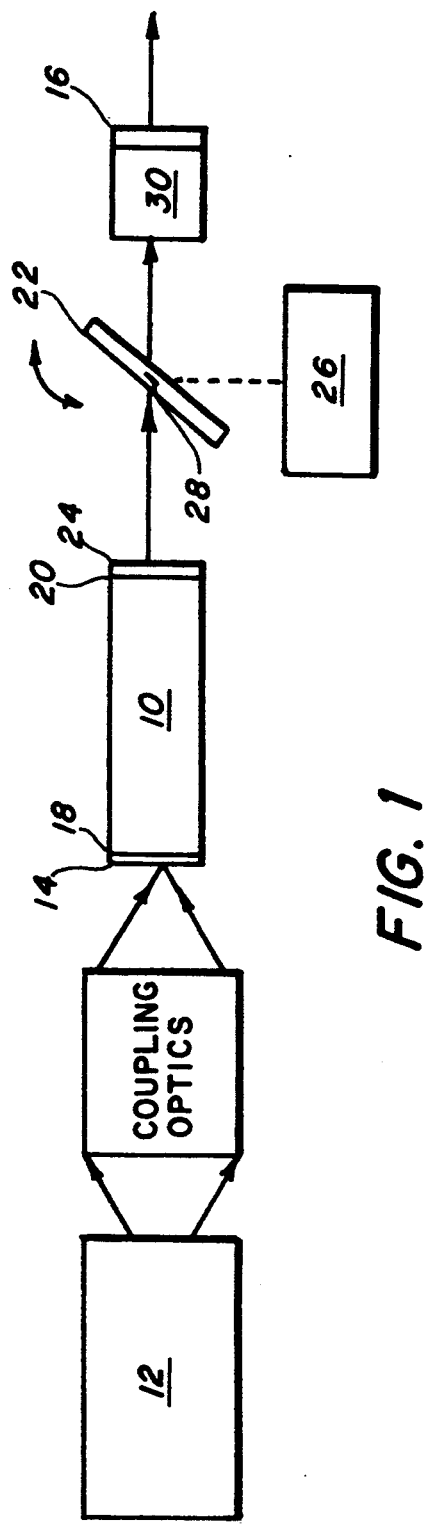
FIG. 1
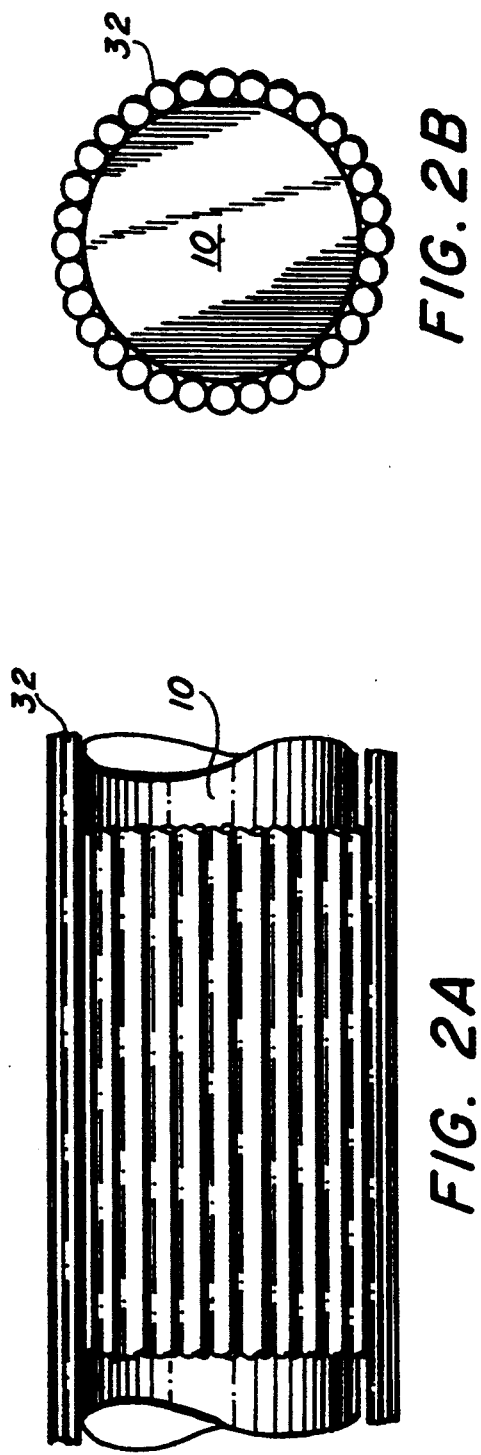
FIG. 2B
FIG. 2A 15,381,428

TUNABLE YTTERBIUM-DOPED SOLID STATE LASER

BACKGROUND OF THE INVENTION

1. Field of the Invention

The present invention relates to lasers and more particularly to tunable ytterbium-doped solid state lasers.

2. Description of the Related Art

It is desired to develop tunable lasers that operate in the wavelength ranges of about 1020 nm to about 1050 nm, and about 510 nm to about 525 nm.

Neodymium solid-state lasers (e.g. Nd:YAG) are widely used in a variety of applications. One problem with neodymium lasers is that they have moderate wall-plug-to-output efficiency. Neodymium has a narrow absorption band (about 3 nm). Consequently, the pump diodes must be carefully engineered and cooled to keep them at the same wavelength. Precise temperature control is required, consuming a great deal of power for refrigeration. Moreover, neodymium has a short fluorescence lifetime, about 230 $\mu$s. For a diode-pumped laser, this dramatically increases the cost of the system, since a large number of expensive diode arrays are required for operation.

Ytterbium solid-state lasers have advantages over Nd lasers. See U.S. Pat. No. 5,123,026, issued Jun. 16, 1992 to Fan et al., which is incorporated herein by reference. This patent discloses a frequency-doubled, diode-pumped ytterbium laser operating at 515 nm (frequency-doubled laser oscillation at 1030 nm). To confine oscillation to 1030 nm, Fan '026 teaches the use of a fixed wavelength discrimination element for suppressing laser oscillation at 1048 nm. As will be explained infra, this is a less preferred configuration for a ytterbium solid-state laser.

Tunable lasers are desired in the laser art. See U.S. Pat. No. 4,969,150, issued Nov. 6, 1990 to Esterowitz et al., which is incorporated herein by reference. This patent discloses a tunable cw thulium-doped solid-state laser.

Lasers for point-to-point communications are desired in the laser art. One desired feature of a laser for point-to-point communications is a high signal-to-noise ratio. Solar radiation is the major source of noise for above-ground point-to-point laser communications.

Examination of the solar spectrum during the 19th century revealed that the spectrum departs from a continuous spectrum as would be expected for a simple blackbody radiator. Fraunhoffer was the first to report that there were dark lines, i.e. narrow spectral regions where there was little apparent radiation compared to adjacent spectral regions. This phenomena was understood to be caused by elements in the solar corona, e.g. hydrogen, absorbing the radiation from the element in the core of the sun. The less than total absorption and the shape of these lines are caused by the differing regimes of pressure and temperature in the core and corona.

Lasers for underwater communications are desired in the laser art. Only for a range of wavelengths between about 450 nm and 540 nm is oceanic water transparent enough to allow reasonable signal levels to be achieved for even moderate depths for a submerged platform. A number of the Fraunhoffer lines are in this spectral range. Operation of a communications system at one or more of these wavelengths could take advantage of the improvement in signal to noise level offered by a noise level which can be 5-10 times lower than at other wavelengths.

SUMMARY OF THE INVENTION

Accordingly, it is an object of this invention to make an efficient, tunable ytterbium solid-state laser.

It is a further object of this invention to make a tunable solid-state laser for point-to-point communications applications with an enhanced signal-to-noise ratio.

It is a further object of this invention to make a tunable solid-state laser operating at one of the Fraunhoffer lines in the solar spectrum.

It is a further object of this invention to make a tunable solid-state laser operating between about 450 nm and 540 nm.

These and additional objects of the invention are accomplished by the structures and processes hereinafter described.

A tunable ytterbium-doped solid-state laser has a laser cavity defined a pair of mirrors, a laser medium positioned in this cavity, means for pumping the laser medium, and means for tuning the output of this laser medium to a selected wavelength within a wavelength range. The laser medium has a host material doped with enough ytterbium ions to produce a longitudinal mode laser emission when the laser medium is pumped.

BRIEF DESCRIPTION OF THE DRAWINGS

A more complete appreciation of the invention will be readily obtained by reference to the following Description of the Preferred Embodiments and the accompanying drawings in which like numerals in different figures represent the same structures or elements, wherein:

FIG. 1 shows a preferred embodiment of the invention.

FIGS. 2A and 2B show, respectively, side and end views of a preferred side-pumping configuration.

DESCRIPTION OF THE PREFERRED EMBODIMENTS

Figure 3A:
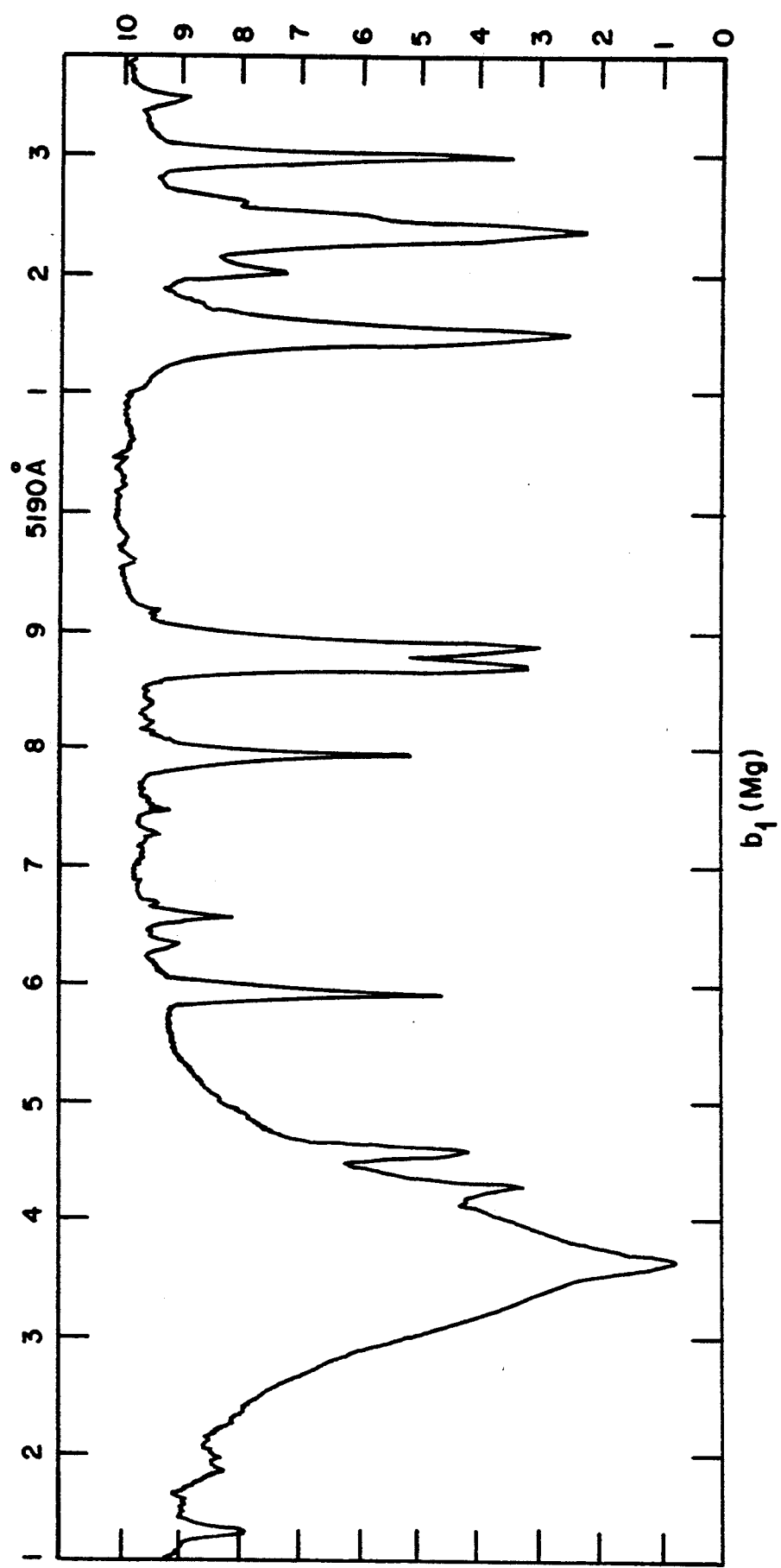
FIGS. 3A and 3B show portions of the solar spectrum.

As shown in FIG. 1, in a preferred embodiment of the invention a ytterbium-doped (Yb$^{3+}$-doped) laser medium 10 is end-pumped by a diode array 12 to produce a laser emission that is tunable over the range of about 1020 nm to about 1050 nm.

The solid-state laser includes a laser medium 10 disposed in a laser cavity defined by a pair of optically aligned mirrors 14,16 opposing each other along a common axis to form a reflective path between them.

The laser medium 10 can have a typical length between about 0.5 mm and about 10 mm. Preferably, the laser medium is between about 1.5 mm and about 3 mm long, and has opposing flat and parallel surfaces 18,20. The most preferred length is about 2 mm. The first of these opposing flat and parallel surfaces 18 is the input surface, and has a dichroic coating 14, which preferably serves as the first (input) mirror. However, it should be understood that the first mirror alternatively is a separate mirror spaced apart from the laser crystal. The dichroic coating has a high transmission at the pump wavelength and a high reflection in the laser emission wavelength range.

The second (output) mirror 20 that defines the laser cavity is also reflective in the laser emission wavelength range. However, the output mirror is at least partially, preferably about 0.5%, transmissive in the laser emission wavelength range. This permits the output mirror to output the light produced by the laser medium when it is pumped by the diode pumping means.

A tuning element 22 is inserted in the cavity at Brewster's angle, between the laser medium 10 and the output mirror 16. This tuning element may be a birefringent tuning plate, a grating, or a prism. The coatings 14,24 of the laser medium have sufficient bandwidth to allow tuning over the desired wavelength range of about 1020 nm to 1050 nm.

Figure 4:
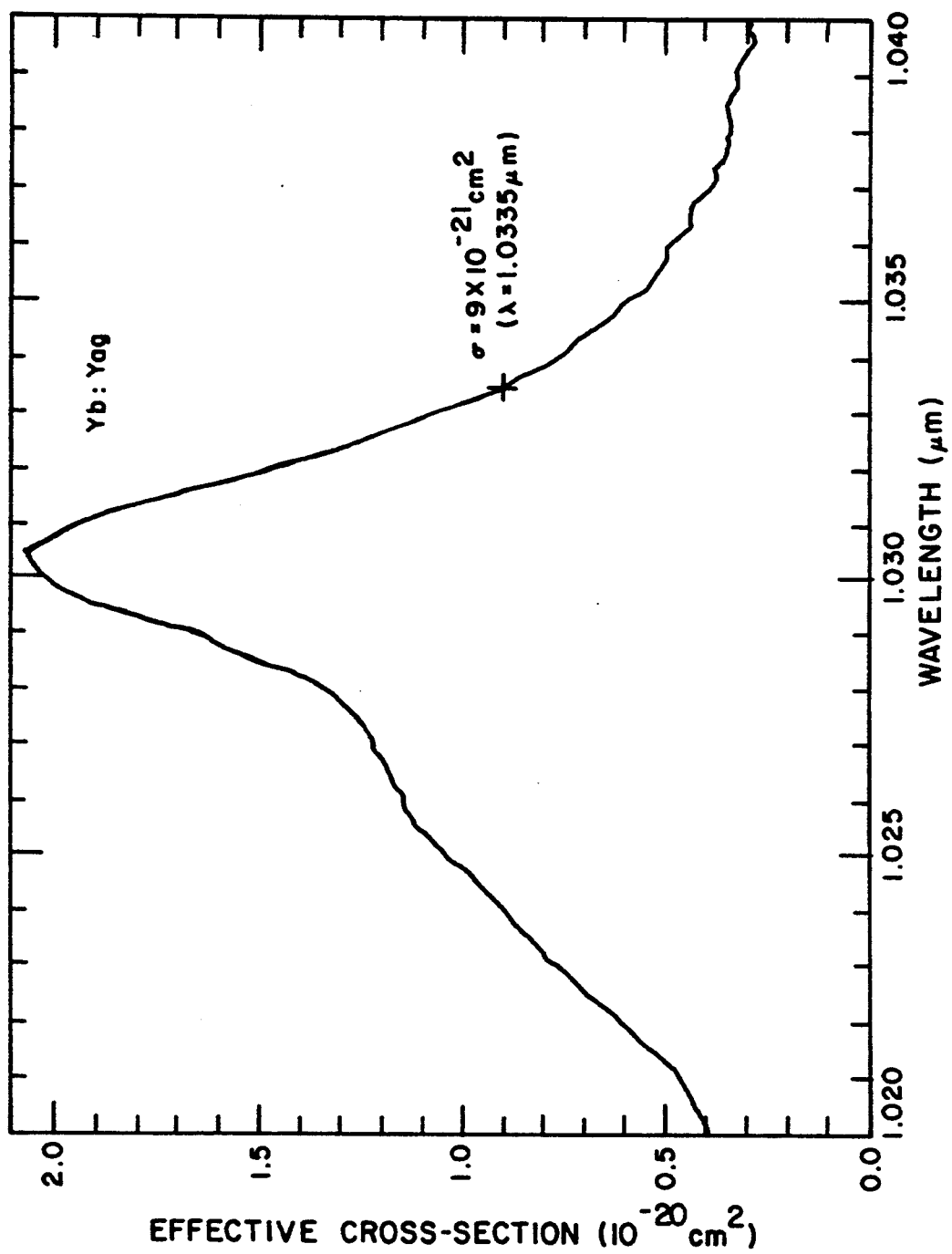
FIG. 4 shows a fluorescence spectrum for Yb:YAG.

Continuous tuning of the laser is achieved over the desired wavelength range by using a motor 26 which is operationally coupled to the tuning element 22, to slowly rotate the tuning element about its axis 28 in either of the directions indicated by the arc. Tunability is goverend by the fluorescence, which is shown for Yb:YAG in FIG. 4.

Figure 3B:
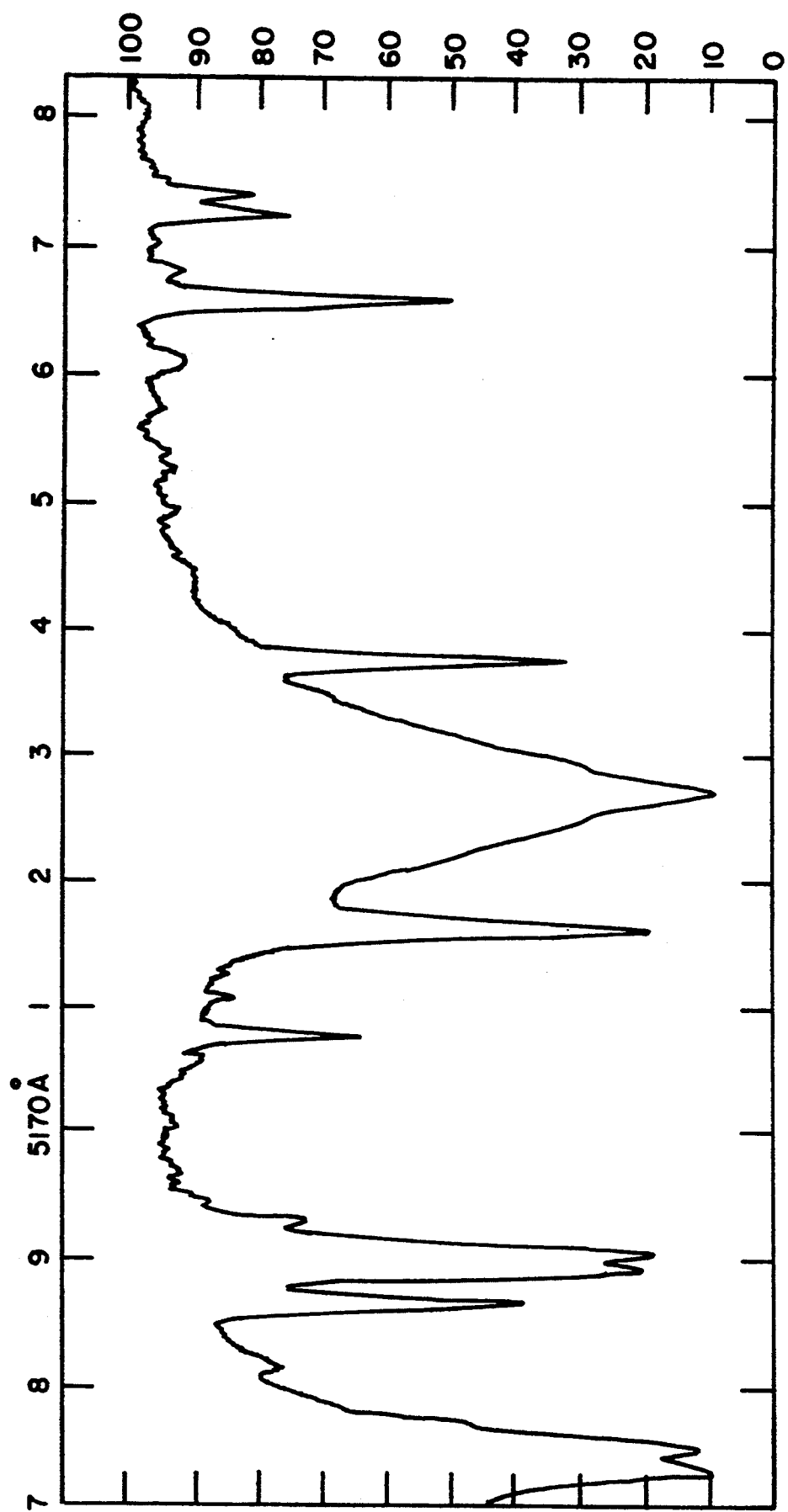

Frequency-doubled operation in the wavelength range of about 510 nm to about 525 nm preferably is provided by a frequency-doubling crystal 30. As shown in FIGS. 3A and 3B, this wavelength range includes the green Mg Fraunhoffer lines at about 516.74 nm, about 517.27 nm, and about 518.37 nm. Most preferably, this crystal is disposed intracavity, to take advantage of the high intracavity intensities. Alternatively, the doubling crystal is disposed outside the laser cavity or within a separate cavity. Preferred materials for doubling crystals include potassium titanyl phosphate (KTP), yttrium aluminum borate (YAB), lithium borate (LiB$_3$O$_5$), potassium niobate (KNbO$_3$), and lithium niobate (LiNbO$_3$).

The laser medium 10 comprises a host material doped with Yb$^{3+}$ ions. The host material is selected from the group consisting of oxide, fluoride, and glassy host materials for solid state lasers, and mixtures thereof. Available oxide host materials for solid-state lasers include garnet host materials and perovskite host materials, and mixtures thereof. The available host materials include yttrium aluminum garnet (YAG), yttrium scandium aluminum garnet (YSAG), CaF$_2$, Gd$_3$Ga$_5$O$_{12}$ (GGG), gadolinium scandium aluminum garnet (GSAG), Lu$_3$Al$_5$O$_{12}$, Lu$_3$Sc$_2$Al$_3$O$_{12}$, YAlO, BEL, BaF$_2$, LiYF$_4$, GSGG, and mixtures thereof. Preferred host materials include YAG, GSAG, and mixtures thereof.

Skilled practitioners will recognize that the dimensions and doping level of the laser medium according to this invention will be interrelated. Skilled practitioners also will recognize that these parameters will also depend on the particular host selected, the pumping scheme employed, and the desired efficiency of the laser. The laser medium preferably is doped with between about 0.25 at % and about 80 at % Yb$^{3+}$. Skilled practitioners will recognize that ytterbium ions are readily doped into hosts with yttrium or ytterbium lattice positions.

FIGS. 2A and 2B show a preferred side-pumping scheme for pumping with diode arrays. In this preferred embodiment, optical fibers 32 carrying the diode pump radiation are longitudinally bonded to the laser medium 10. This preferred embodiment confers several advantages. Operation at a pump and stored energy density where Yb in YAG or other hosts should be at least as efficient as in Nd:YAG. Moreover, this architecture can scale over the desired range of laser energies and repetition rates (e.g. for both uplink and downlink lasers) by changing the laser rod cross-sectional area. Higher energy can be achieved by paralleling lasers. Also, pump energy distributions can be tailored to give relatively uniform spatial gain profiles, which are desired for efficient frequency doubling and energy extraction.

Obviously, many modifications and variations of the present invention are possible in light of the above teachings. It is therefore to be understood that, within the scope of the appended claims, the invention may be practiced otherwise than as specifically described.

What is claimed is:

1. A tunable ytterbium-doped solid-state laser, comprising:
   a laser cavity defined by a first mirror and an opposing second mirror;
   a laser medium disposed in said laser cavity, further comprising a host material doped with an amount of ytterbium ions sufficient to produce a longitudinal mode laser emission when said laser medium is pumped by pumping means;
   means for pumping said laser medium; and
   means for tuning within said laser cavity said laser emission to one of a plurality of wavelengths within a first wavelength tuning range.

2. The solid-state laser of claim 1, wherein said first wavelength tuning range comprises wavelengths between about 1020 nm and about 1050 nm.

3. The solid-state laser of claim 1, wherein said host material is selected from the group consisting of oxide, fluoride, and glassy host materials for solid state lasers, and mixtures thereof.

4. The solid-state laser of claim 1, wherein said host material is an oxide host material selected from the group consisting of garnet host materials and perovskite host materials, and mixtures thereof.

5. The solid-state laser of claim 1, wherein said host material is selected from the group consisting of YAG, YSAG, CaF$_2$, GGG, GSAG, Lu$_3$Al$_5$O$_{12}$, Lu$_3$Sc$_2$Al$_3$O$_{12}$, YAlO, BEL, BaF$_2$, LiYF$_4$, GSGG, and mixtures thereof.

6. The solid-state laser of claim 1, wherein said laser medium comprises between about 0.25 at % and about 80 at % Yb$^{3+}$.

7. The solid-state laser of claim 1, wherein said tuning means comprises:
   a tuning element; and
   means for rotating said tuning element about its axis to tune the laser emission to a wavelength within said wavelength tuning range.

8. The solid-state laser of claim 7, wherein said tuning element is disposed within said laser cavity.

9. The solid-state laser of claim 7, wherein said tuning element comprises a birefringent tuning plate.

10. The solid-state laser of claim 7, wherein said tuning element comprises a grating.

11. The solid-state laser of claim 7, wherein said tuning element comprises a prism.

12. The solid-state laser of claim 1, wherein said pumping means comprise diode pumping means.

13. The solid-state laser of claim 12, wherein said diode pumping means comprise a diode laser array.

14. The solid-state laser of claim 13, wherein said diode laser array comprises an InGaAs strained layer diode array.

15. The solid-state laser of claim 1, further comprising means for doubling the frequency of said laser emission, wherein said tuning means comprise means for tuning said frequency-doubled laser emission to one of a plurality of wavelengths within a second wavelength tuning range, wherein each of said wavelengths in said second wavelength tuning range are one half of a wavelength within said first wavelength tuning range.

16. The solid-state laser of claim 15, wherein said second wavelength tuning range comprises wavelengths between about 510 nm and about 525 nm.

17. The solid-state laser of claim 15, wherein said means for tuning said frequency-doubled laser emission to one of a plurality of wavelengths within a second wavelength tuning range comprise means for tuning said frequency-doubled laser emission to a wavelength corresponding to one of the Fraunhoffer lines in the solar spectrum.

18. The solid-state laser of claim 15, wherein said frequency doubling means are disposed within said laser cavity.

19. The solid-state laser of claim 15, wherein said frequency doubling means comprise a crystal further comprising a material selected from the group consisting of KTP, YAB, $LiB_3O_5$, $KNbO_3$, and $LiNbO_3$.

20. The solid-state laser of claim 17, wherein said wavelength corresponding to one of the Fraunhoffer lines in the solar spectrum is about 516.74 nm.

21. The solid-state laser of claim 17, wherein said wavelength corresponding to one of the Fraunhoffer lines in the solar spectrum is about 517.27 nm.

22. The solid-state laser of claim 17, wherein said wavelength corresponding to one of the Fraunhoffer lines in the solar spectrum is about 518.37 nm.

23. A tunable solid-state laser, comprising:
    a laser cavity defined by a first mirror and an opposing second mirror;
    a laser medium disposed in said laser cavity, further comprising a host material doped with an amount of dopant ions sufficient to produce a longitudinal mode laser emission when said laser medium is pumped by pumping means;
    means for doubling the frequency of said laser emission;
    means for pumping said laser medium; and
    means for tuning said laser emission to a wavelength corresponding to one of the Fraunhoffer lines in the solar spectrum.

* * * * *